(12) United States Patent
Schneider

(10) Patent No.: US 7,258,331 B2
(45) Date of Patent: Aug. 21, 2007

(54) ACOUSTICALLY DECOUPLED HYDRAULIC BEARING

(75) Inventor: Diethard Schneider, Celle (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 11/013,414

(22) Filed: Dec. 17, 2004

(65) Prior Publication Data

US 2005/0151309 A1 Jul. 14, 2005

(30) Foreign Application Priority Data

Jan. 8, 2004 (DE) ...................... 10 2004 001 322

(51) Int. Cl.
*F16F 5/00* (2006.01)
*F16M 1/00* (2006.01)

(52) U.S. Cl. .............................. 267/140.13; 267/140.2

(58) Field of Classification Search ........... 267/140.11, 267/140.13, 140.14, 140.15, 141, 140.2; 248/560, 562, 636, 637, 638

See application file for complete search history.

(56) References Cited

U.S. PATENT DOCUMENTS

| | | | | |
|---|---|---|---|---|
| 4,422,779 A | * | 12/1983 | Hamaekers et al. | ......... 384/99 |
| 4,662,418 A | * | 5/1987 | Janus | ........................ 152/380 |
| 4,700,931 A | | 10/1987 | Eberhard et al. | |
| 4,938,448 A | * | 7/1990 | Shimazaki | .................. 248/635 |
| 5,344,127 A | | 9/1994 | Hettler et al. | |
| 5,707,047 A | * | 1/1998 | Meyering et al. | ...... 267/140.13 |
| 6,390,459 B2 | * | 5/2002 | Saitoh | .................... 267/140.13 |
| 6,523,816 B1 | * | 2/2003 | Gastineau et al. | ..... 267/140.14 |
| 6,536,113 B2 | * | 3/2003 | Guillemot | ................ 29/896.93 |
| 2002/0043748 A1 | | 4/2002 | Meyer | |
| 2002/0171186 A1 | * | 11/2002 | Baudendistel et al. | . 267/140.15 |
| 2004/0070125 A1 | * | 4/2004 | Nakagaki et al. | ...... 267/140.14 |

FOREIGN PATENT DOCUMENTS

| | | |
|---|---|---|
| DE | 38 07 789 | 9/1989 |
| DE | 42 05 355 | 2/1993 |
| DE | 196 50 470 | 7/1997 |
| DE | 196 12 153 | 10/1997 |
| DE | 196 50 230 | 6/1998 |
| JP | 2000266109 A * | 9/2000 |

* cited by examiner

*Primary Examiner*—Melody M. Burch
(74) *Attorney, Agent, or Firm*—Walter Ottesen

(57) ABSTRACT

A hydraulic bearing includes a support spring made of elastomeric material and a hydraulic volume partitioned into a work chamber and a compensating chamber. A partition wall is disposed between the two chambers and includes a transfer channel. For acoustic decoupling, a membrane-like decoupling element is seated and is displacement limited between two lattice plates. The decoupling element is made of flexible elastic material and is clamped laterally to be pressure tight. The decoupling membrane is radially pre-stressed for matching the acoustic decoupling to specific disturbing frequencies (hum frequencies). This prestressing takes place preferably because of the shrink process during vulcanization of the decoupling membrane which is made of raw rubber. The decoupling membrane can have a peripheral bead and at least one transverse strut. The strut can have a reinforcement insert.

6 Claims, 6 Drawing Sheets

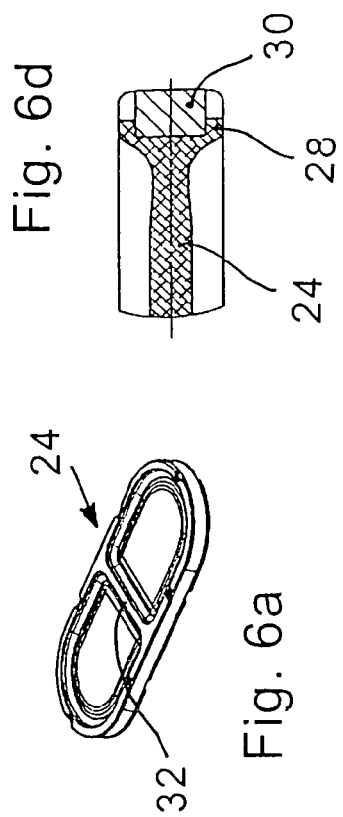
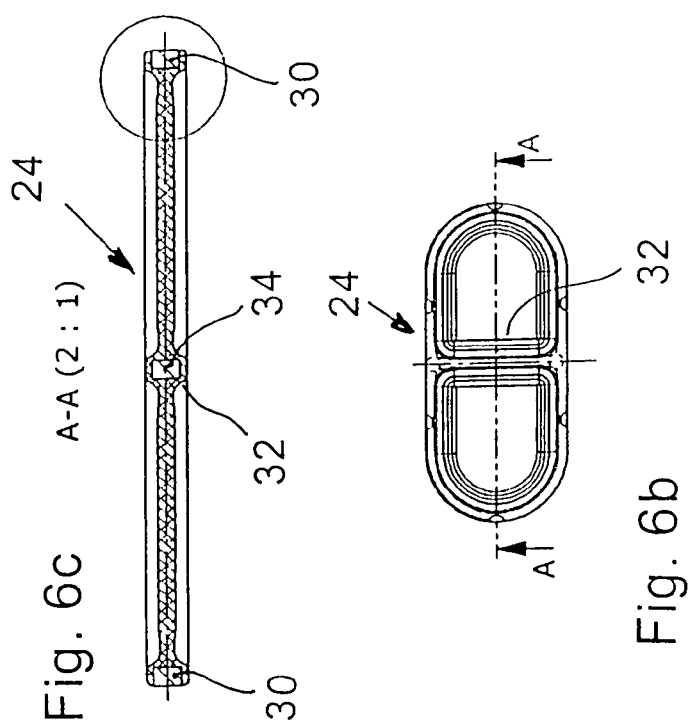
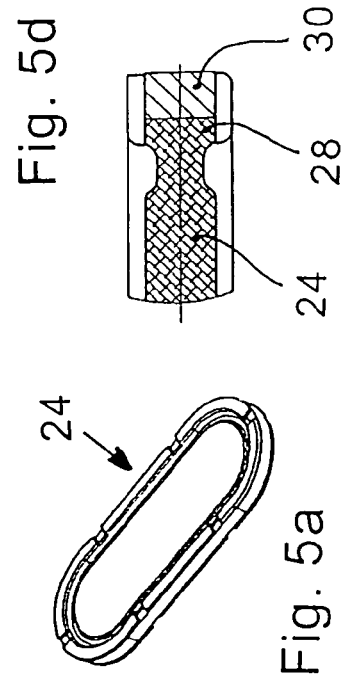
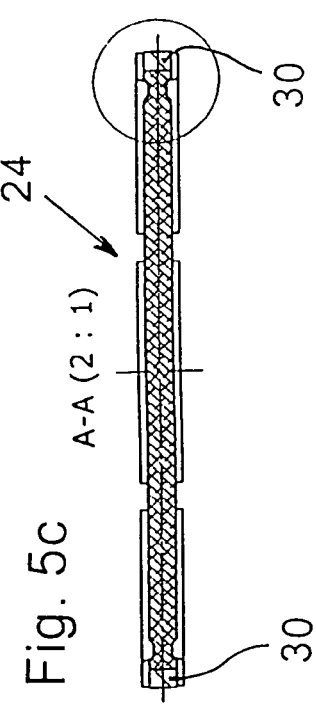

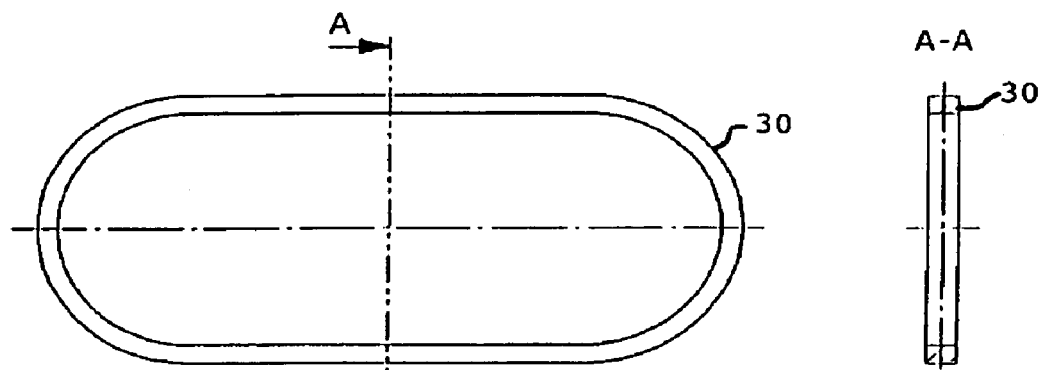
Fig. 7b
Fig. 7a
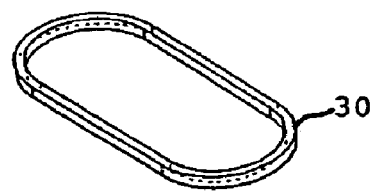
Fig. 7c
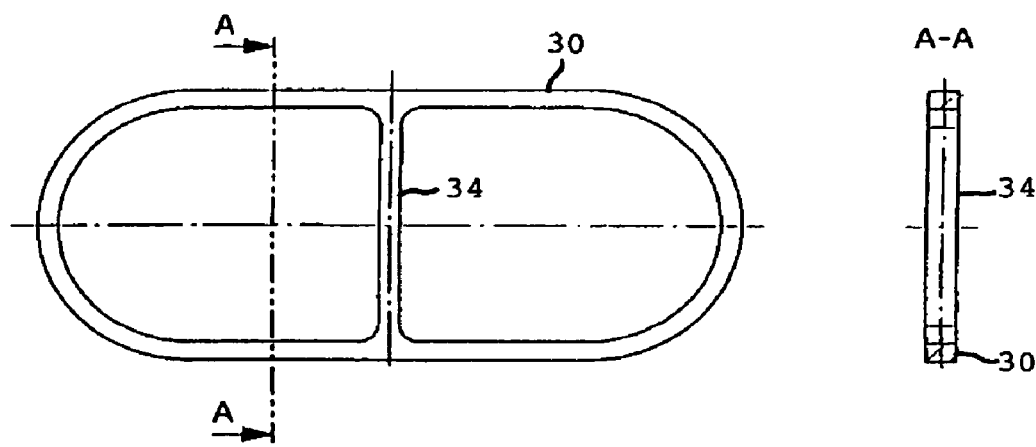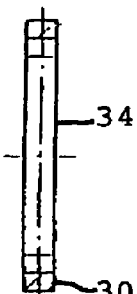
Fig. 8b
Fig. 8a
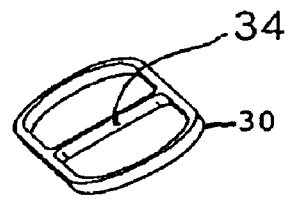
Fig. 8c

ACOUSTICALLY DECOUPLED HYDRAULIC BEARING

CROSS REFERENCE TO RELATED APPLICATION

This application claims priority of German patent application no. 10 2004 001 322.5, filed Jan. 8, 2004, the entire content of which is incorporated herein by reference.

FIELD OF THE INVENTION

The invention relates to an acoustically decoupled hydraulic bearing which is especially used for the elastic support of motors of motor vehicles.

BACKGROUND OF THE INVENTION

In their basic configuration, hydraulic bearings of this kind usually comprise a rubber element as a support spring in combination with a hydraulic damper. The hydraulic damper, in turn, comprises a hydraulic volume which is partitioned by a partition wall into a work chamber and a compensating chamber. The partition wall is provided with at least one throttle channel. With the aid of such hydraulic bearings, which are disposed between the vehicle motor and the chassis, it is intended, on the one hand, to prevent that motor vibrations are transmitted to the chassis and, on the other hand, it is intended that the shaking, which results during driving operation, cannot reach the motor from the chassis or reach the motor only dampened.

Furthermore, it is prevented that acoustic vibrations can reach the chassis and especially acoustic vibrations in the form of structure-borne noise. For this purpose, the partition wall, which is disposed between the work chamber and the compensating chamber, includes a further opening which is covered by a flexible to rigid component. This component is usually characterized as a membrane and is axially moveable over a clear path. In addition to functioning as a vibration-damping support construction for motor vehicle engines, such hydraulic bearings function to filter acoustic vibrations.

These acoustic vibrations are of higher frequencies but lower amplitudes. To take up these acoustic vibrations, this membrane-like component is provided with lattice plates on respective sides thereof which function as displacement-limiting end stops. The membrane-like component is also characterized as an acoustic membrane.

Two principally different constructions are used in hydraulic bearings as components for decoupling or damping acoustic vibrations, namely:

(1) loose, axially-moveable plates in the manner of floating pistons with these plates not being laterally clamped; and, (2) flexible laterally-clamped membranes.

Plates, which are not laterally clamped, present the following disadvantages:

(a) A slit is provided between the edge of the plate and the edge of the partition wall recess holding the edge. Depending upon the position of the plate, the slit can be larger or smaller. This slit defines a bypass which is connected in parallel to the damping channel. Because of its uncontrollable size, the bypass influences the damping characteristics of the bearing in a nonreproducible manner.

(b) The plates act as floating pistons which are effective as structure-borne noise filters only when the plate does not lie on the one or the other of the displacement limits. Lying against the displacement limits is not only present when the acoustic amplitude is greater than or equal to the clear path of the plate but also when a quasi steady state uneven pressure distribution is present on both sides of the plate because of the flow resistance effective in the damping channel. More specifically, the plates are effective as structure-borne noise filters only under the above-mentioned limiting preconditions.

The invention is concerned with the use of membranes according to point (2) above.

U.S. Pat. No. 4,700,931 discloses an elastic bearing for supporting engines, machine assemblies, et cetera. A specifically configured decoupling membrane, which is reinforced at the periphery, is provided for improving the acoustic characteristics. This decoupling membrane has an edge which is clamped into a partition plate cutout and can move between limiting lattices within a clear path on both sides. Neither a radial prestressing is adjusted or has to be adjusted nor is a matching to a specific natural frequency or resonance frequency required so that it remains unclear, in detail, in which frequency range an acoustic improvement could function and if so, how.

U.S. Pat. No. 5,344,127 discloses a switchable hydraulic bearing which includes an annularly-shaped acoustic membrane whose reinforced edge is axially clamped at a partition plate cutout (see FIG. 5 of this patent). It is not explained in detail as to whether a matching of the membrane to specific frequencies or frequency ranges takes place.

German patent publication 196 50 230 likewise discloses a hydraulic bearing with an acoustic filter component. This filter component includes an additional compensating chamber which is closed off against the hydraulic chamber by a throttle membrane and is closed off relative to the (first) compensating chamber by an additional (second) compensating chamber membrane. A flow channel connects the second compensating chamber to the work chamber or to the first compensating chamber. With this acoustic filter component, it is intended that the increase of the dynamic spring rate to a second stiffness level is prevented. This increase is construction dependent in simple hydraulic bearings.

SUMMARY OF THE INVENTION

It is an object of the invention to provide a hydraulic bearing having acoustic decoupling with the acoustic decoupling being matched to a specific resonance frequency (hum frequency).

The hydraulic bearing of the invention includes: a pot-shaped housing containing a hydraulic volume; a support spring disposed in the pot-shaped housing and being made of elastomeric material; a compensating membrane disposed in the housing; the support spring being arranged in the pot-shaped housing so as to cause the support spring to close off the hydraulic volume from above and the compensating membrane being arranged in the pot-shaped housing so as to cause the compensating membrane to close off the hydraulic volume from below; a partition wall for partitioning the hydraulic volume into a work chamber and a compensating chamber; a transfer channel disposed in the partition wall for interconnecting the chambers; the partition wall defining an opening; a radially prestressed membrane-like decoupling element fixed in the opening and being made of flexible elastic material; the decoupling element being laterally clamped so as to be pressure tight; a lattice base plate and a lattice throttle plate disposed in the housing; and, the decoupling element being between the plates which act to limit displacement of the decoupling element.

The advantages of the invention are found in the very substantial avoidance of the problems set forth above.

The radial prestressing of the decoupling element is so selected that its natural frequency lies in the range of the hum frequency to be reduced. The disturbance noise transmission from motor to chassis is substantially suppressed because of the dynamic stiffness lowering in the critical rpm range.

The decoupling element includes a reinforcing insert, preferably with a peripheral bead.

The use of raw rubber in the manufacture of the decoupling membrane provides the wanted prestress already as a consequence of the vulcanization process. In addition to prestressing, the natural frequency of the decoupling element is influenced by the parameters: length expansion, width expansion and shore hardness. If the decoupling membrane is not circular, but the length and width deviate from each other, then different natural frequencies result because of this whereby a certain bandwidth of the stiffness reduction results. The frequency response can be additionally influenced with the aid of transverse struts integrated into the decoupling membrane.

BRIEF DESCRIPTION OF THE DRAWINGS

The invention will now be described with reference to the drawings wherein:

FIG. 3c shows a longitudinal section view of the lattice base plate of FIG. 3a;

FIG. 5a shows a first embodiment of the throttle membrane in perspective view;

FIG. 5b shows the throttle membrane of FIG. 5a in plan view;

FIG. 5c shows the throttle membrane of FIG. 5a in longitudinal section;

FIG. 5d shows a detail view of the peripheral region of the throttle membrane of FIG. 5a;

FIG. 6a shows another embodiment of the throttle membrane in a perspective view;

FIG. 6b shows the throttle membrane of FIG. 6a in a plan view;

FIG. 6c shows the throttle membrane of FIG. 6a in longitudinal section;

FIG. 6d shows a detail view of the peripheral edge of the throttle membrane of FIG. 6a in longitudinal section;

FIG. 7a shows a reinforcement insert for the throttle membrane without a transverse strut in plan view;

FIG. 7b shows the reinforcement insert for the throttle membrane in section taken along line A-A of FIG. 7a;

FIG. 7c shows the reinforcement insert of FIG. 7a for the throttle membrane in a perspective view;

FIG. 8a shows a second embodiment of a reinforcement insert for a throttle membrane in plan view;

FIG. 8b shows a section view of the reinforcement insert

FIG. 8c shows the reinforcement insert of FIG. 8a in perspective view;

FIG. 9a is a diagram showing the frequency response of the dynamic stiffness of the hydraulic bearing, especially in the high-frequency range; and, FIG. 9b shows an enlarged view of detail A of the diagram in FIG. 9a.

DESCRIPTION OF THE PREFERRED EMBODIMENTS OF THE INVENTION

Figure 1:
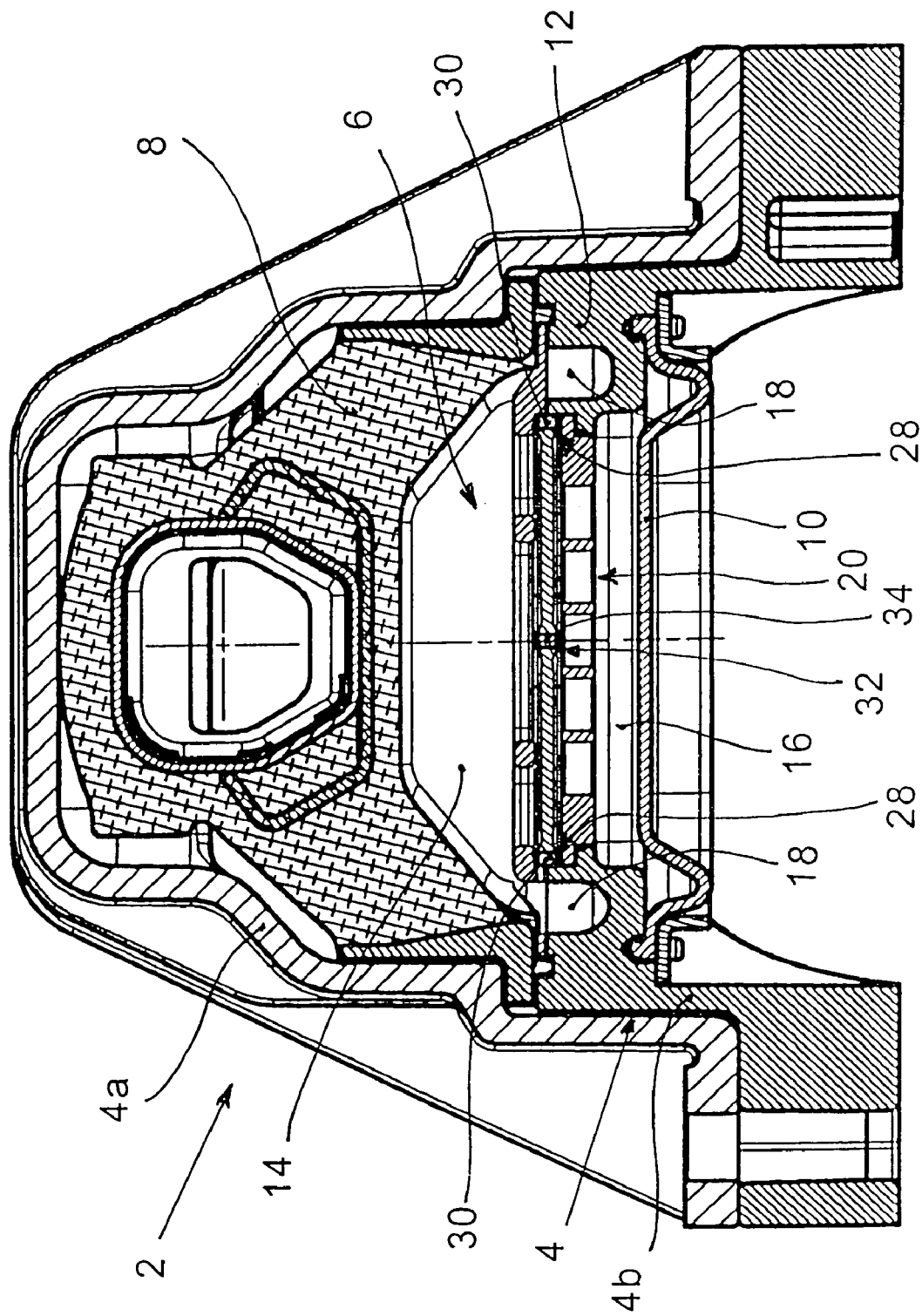
FIG. 1 is an overall side elevation view of an embodiment of the hydraulic bearing of the invention.

FIG. 1 shows a hydraulic bearing 2 in longitudinal section. The hydraulic bearing 2 includes a hydraulic volume 6 disposed in a two-part housing 4 including a first part 4a and a second part 4b. The hydraulic volume 6 is closed off topside by a support bearing (support spring) 8, which is made of elastomeric material, and is closed off at the bottom by a flexible compensating membrane 10. The support spring 8 is mountable by means of a transverse member on a vehicle engine (not shown). The base of the housing 4 is mounted to a vehicle chassis (not shown) by means of threaded fasteners. The hydraulic volume 6 is partitioned into a work chamber 14 and a compensating chamber 16 by a radially extending partition wall 12. For damping the vibrations and shaking, both chambers (14, 16) are connected to each other via a transfer channel (annular channel) 18. Furthermore, the partition wall 12 has a large-dimensioned opening in the center into which a decoupling unit (acoustic filter unit) 20 is fitted for filtering structure-borne noise.

The configuration of the acoustic filter unit 20 will now be explained with respect to FIG. 2.

Figure 2:
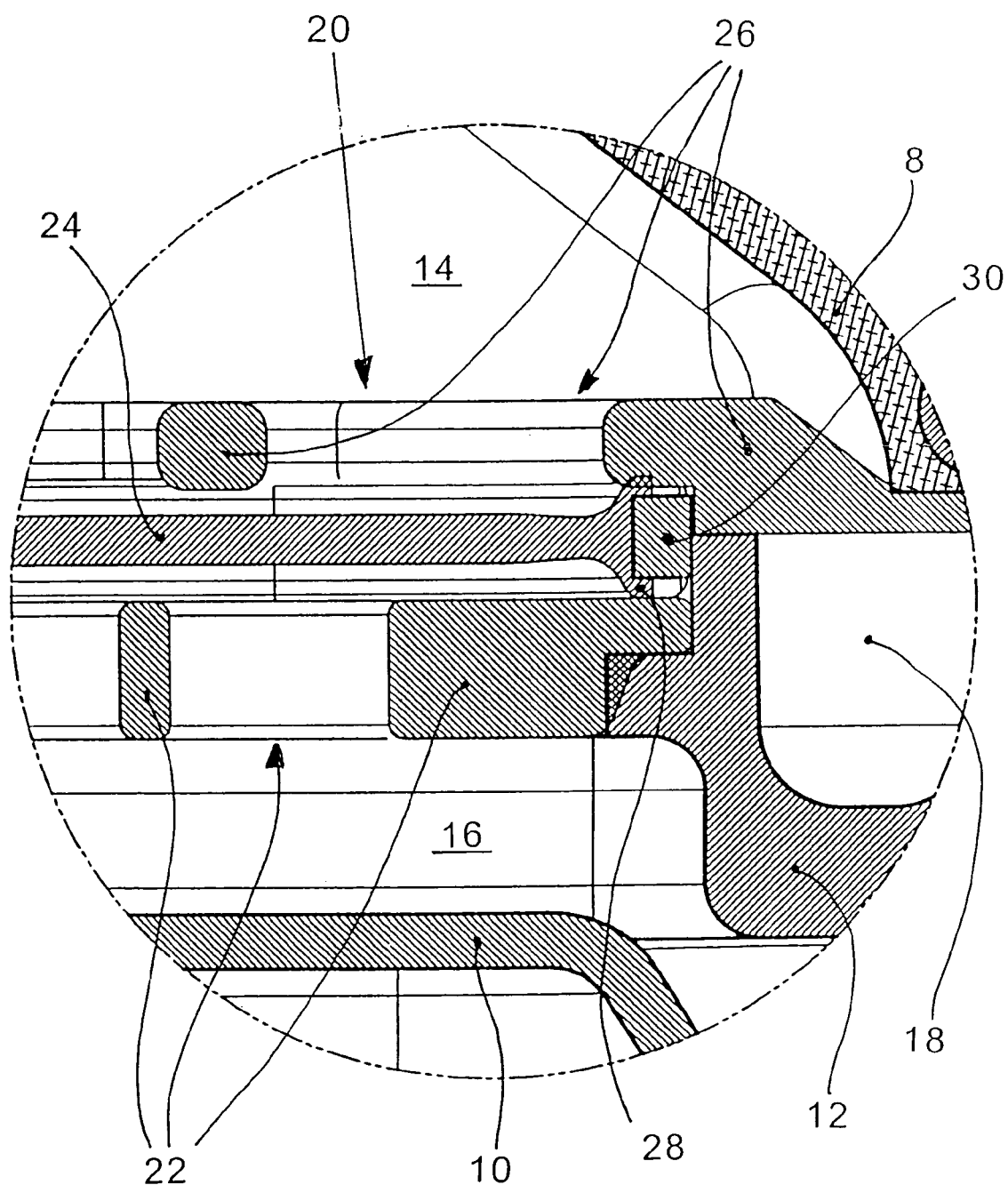
FIG. 2 is a detail view of the partition plate of the hydraulic bearing in addition to the acoustic filter also in longitudinal section.
Figure 3A:
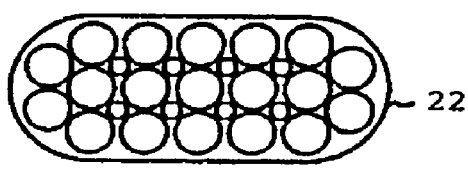
FIG. 3a shows a lattice base plate in plan view.
Figure 3B:
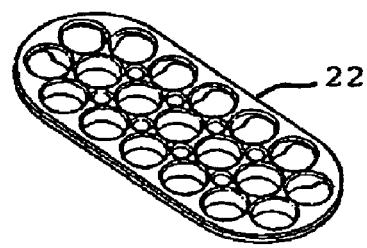
FIG. 3b shows the lattice base plate of FIG. 3a in a perspective view.
Figure 3C:
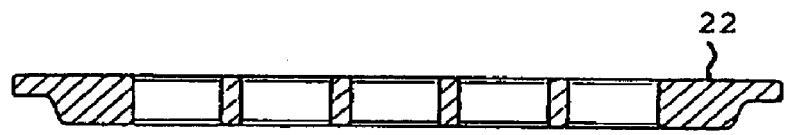
Figure 4A:
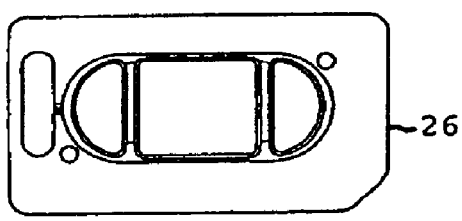
FIG. 4a shows a lattice throttle plate as seen from below.
Figure 4B:
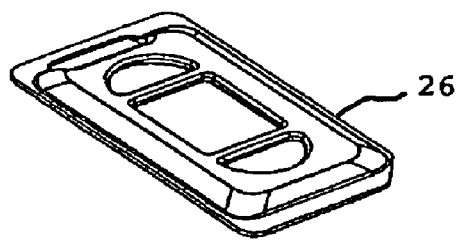
FIG. 4b shows the lattice throttle plate of FIG. 4a in a perspective view.
Figure 4C:
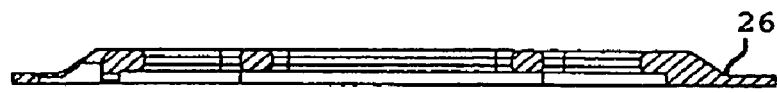
FIG. 4c shows the lattice throttle plate of FIG. 4a in a longitudinal section view.

The acoustic filter unit 20 shown in FIG. 2 comprises a lattice base plate 22 (see also FIG. 3), a throttle membrane (decoupling element) 24 (see also FIGS. 5 and 6) and a lattice throttle plate 26 (see also FIG. 4).

The throttle membrane 24 is clamped in along its edge at the edge of the partition wall opening in such a manner that the partition wall 12 is closed off pressure tight thereby. A liquid flow from the work chamber 14 to the compensating chamber 16 is therefore possible exclusively via the annularly-shaped throttle channel 18 (see FIG. 1). In the present embodiment, the clamping of the membrane 24 is only axial. A radial prestressing is not provided when installing.

FIGS. 2, 5 and 6 further show that the throttle membrane 24 has a peripheral bead 28. The throttle membrane can be made of rubber or an elastomeric plastic.

The peripheral bead 28 includes a reinforcement insert 30 made of metal or plastic. In addition to the peripheral bead 28, which is provided with the reinforcement insert 30, the membrane 24 of the invention can have at least one reinforcement transverse strut 32. In the embodiment shown in FIGS. 5 and 6, the membrane 24 is not circular but is configured to be elongated. In addition to a peripheral bead 28, which is provided with a reinforcement insert 30 shown in FIGS. 7a to 7c, the membrane 24 shown includes a transverse strut 32 connecting the two longitudinal sides to each other. This transverse strut 32 also is not only a bead-shaped thickening of the membrane 24 but is likewise provided with a reinforcement insert 34 shown in FIGS. 8a to 8c.

In FIGS. 7a to 7c and FIGS. 8a to 8c, two different embodiments of reinforcement inserts (30, 34) are shown. The reinforcement inserts (30, 34) are made of metal or hard plastic.

Figure 9A:
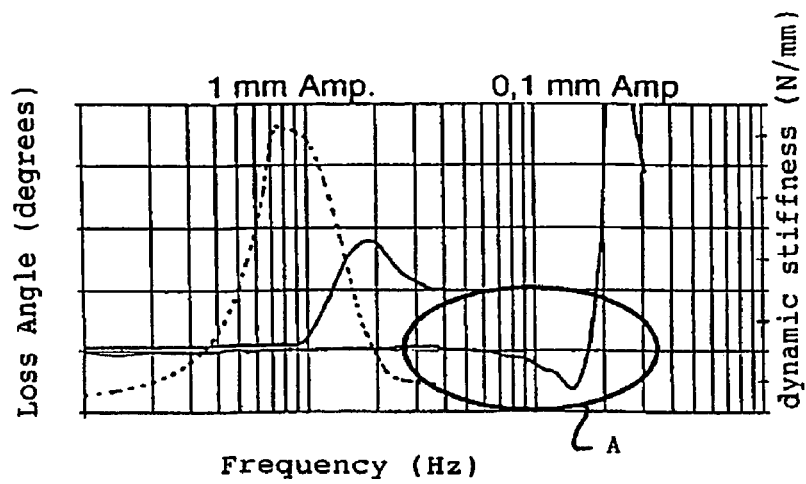
Figure 9B:
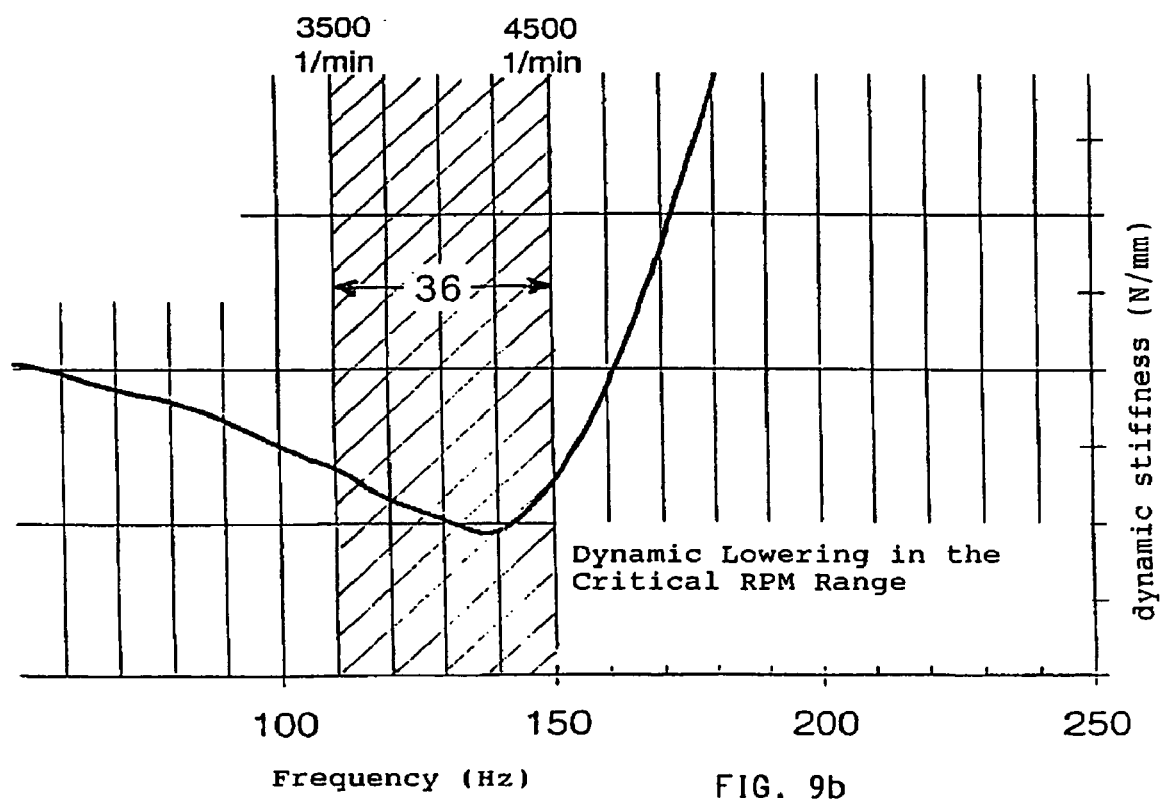

The manufacture of the membrane 24 of the invention takes place in such a manner that a reinforcement insert 30 and possibly a reinforcement insert 34 is provided on one or both sides with the usual vulcanization method and is fully cured. These methods include compression molding (CM) transfer molding (TM) or injection molding (IM). Because of the vulcanization operation, the rubber shrinks so that the finished membrane 24 has a certain prestress. The prestress of the membrane 24 can be a radial prestress which occurs because of a shrink process during vulcanization. The rubber thickness and the shore hardness of the membrane 24 are so selected that a natural frequency results which is matched to the acoustic resonance frequency (hum frequency) which is to be eliminated. This selection is made in combination with other measurements and parameters especially also in connection with the liquid column in the region of the lattice throttle plate 26. In this way, there results a lowering of the dynamic stiffness in the critical rpm range 36 of the vehicle motor supported by the hydraulic bearing 2 of the invention. The critical rpm range 36 corresponds to a frequency of 110 to 150 Hz as shown in FIG. 9b.

With the aid of at least one transverse strut 32, the membrane natural frequency can be substantially influenced. An elongated membrane 24 has natural frequencies, which are different in the longitudinal and transverse directions, so that a broadband-like condition of the absorption spectrum can be realized already with the aid of an undivided elongated membrane 24.

The critical rpm range (at which a lowering of the dynamic stiffness of the hydraulic bearing is to be undertaken), is dependent upon motor series and chassis series and lies approximately between 3,000 rpm and maximum rpm. The curves shown in FIG. 9 are based on measurements made on a four-cylinder in-line engine.

It is understood that the foregoing description is that of the preferred embodiments of the invention and that various changes and modifications may be made thereto without departing from the spirit and scope of the invention as defined in the appended claims.

What is claimed is:

1. A hydraulic bearing having an acoustic decoupling matched to lie in a range of hum frequency, the hydraulic bearing comprising:
   a pot-shaped housing containing a hydraulic volume;
   a support spring disposed in said pot-shaped housing and being made of elastomeric material;
   a compensating membrane disposed in said housing;
   said support spring being arranged in said pot-shaped housing so as to cause said support spring to close off said hydraulic volume from above and said compensating membrane being arranged in said pot-shaped housing so as to cause said compensating membrane to close off said hydraulic volume from below;
   a partition wall for partitioning said hydraulic volume into a work chamber and a compensating chamber;
   a transfer channel disposed in said partition wall for interconnecting said chambers;
   said partition wall defining an opening;
   a radially prestressed decoupling element fixed in said opening and being made of flexible, elastic material;
   said decoupling element being laterally clamped so as to be pressure tight;
   a lattice base plate and a lattice throttle plate disposed in said housing;
   said decoupling element being between said plates which act to limit displacement of said decoupling element;
   said decoupling element being made of rubber or an elastic material and having a peripheral bead containing a reinforcement element; and,
   said radial prestress of said decoupling element occurring because of shrinkage during vulcanization so as to cause said decoupling element to have a natural frequency lying in said range of hum frequency.

2. The hydraulic bearing of claim 1, wherein said decoupling element includes at least one transverse strut.

3. The hydraulic bearing of claim 2, wherein said transverse strut includes a reinforcement insert.

4. A hydraulic bearing for mounting in a motor vehicle for dampingly supporting the motor of the motor vehicle with the motor having a critical rpm range, the hydraulic bearing comprising:
   a pot-shaped housing containing a hydraulic volume;
   a support spring disposed in said pot-shaped housing and being made of elastomeric material;
   a compensating membrane disposed in said housing;
   said support spring being arranged in said pot-shaped housing so as to cause said support spring to close off said hydraulic volume from above and said compensating membrane being arranged in said pot-shaped housing so as to cause said compensating membrane to close off said hydraulic volume from below;
   a partition wall for partitioning said hydraulic volume into a work chamber and a compensating chamber;
   a transfer channel disposed in said partition wall for interconnecting said chambers;
   said partition wall defining an opening;
   a radially prestressed membrane decoupling element fixed in said opening and being made of flexible elastic material;
   said decoupling element being laterally clamped so as to be pressure tight;
   a lattice base plate and a lattice throttle plate disposed in said housing;
   said decoupling element being between said plates which act to limit displacement of said decoupling element;
   said decoupling element being made of rubber or an elastic material and having a peripheral bead containing a reinforcement element;
   said radial prestress of said decoupling element occurring because of shrinkage during vulcanization;
   said membrane decoupling element having a natural frequency matched to the frequency of said critical rpm range; and,
   said natural frequency being dependent upon said radial prestress.

5. The hydraulic bearing of claim 1, wherein said decoupling element has a longitudinal expansion and a width expansion which are selected so that there is a broadbandedness with respect to a dynamic stiffness reduction because of different longitudinal and transverse natural frequencies.

6. The hydraulic bearing of claim 1, wherein said decoupling element has a free path along which to deflect to define an amplitude deflection; and, said plates function as displacement-limiting end stops for said amplitude deflection.

* * * * *

UNITED STATES PATENT AND TRADEMARK OFFICE
CERTIFICATE OF CORRECTION

| | | |
|---|---|---|
| PATENT NO. | : 7,258,331 B2 | Page 1 of 1 |
| APPLICATION NO. | : 11/013414 | |
| DATED | : August 21, 2007 | |
| INVENTOR(S) | : Diethard Schneider | |

It is certified that error appears in the above-identified patent and that said Letters Patent is hereby corrected as shown below:

<u>In column 4</u>:
Line 3: add -- taken along line A-A of FIG. 8a; -- after "insert".

Signed and Sealed this

Eighteenth Day of December, 2007

JON W. DUDAS
*Director of the United States Patent and Trademark Office*